Figure 1:
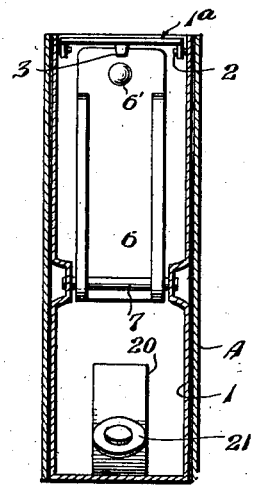

April 26, 1938.   H. MÜLLER ET AL   2,115,315
TOY OR AMUSEMENT DEVICE
Filed March 10, 1937   5 Sheets-Sheet 1

Inventors
Heinrich Müller,
Karl Vogl and
Fritz Gorg.
by Arthur M. Hahn.
Atty

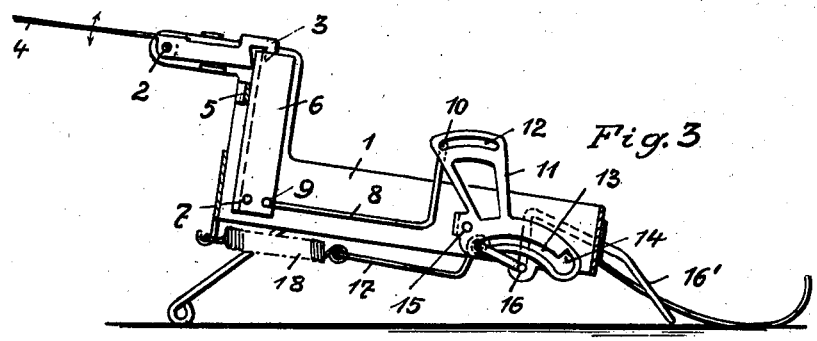
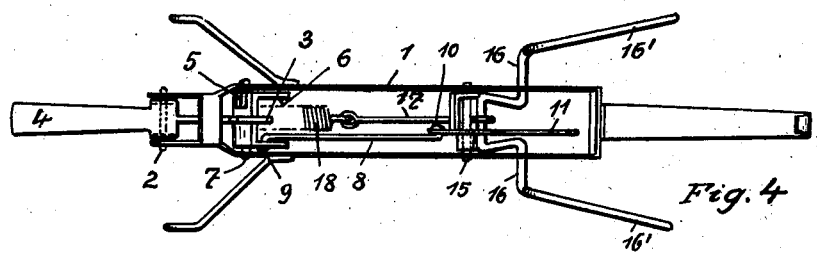
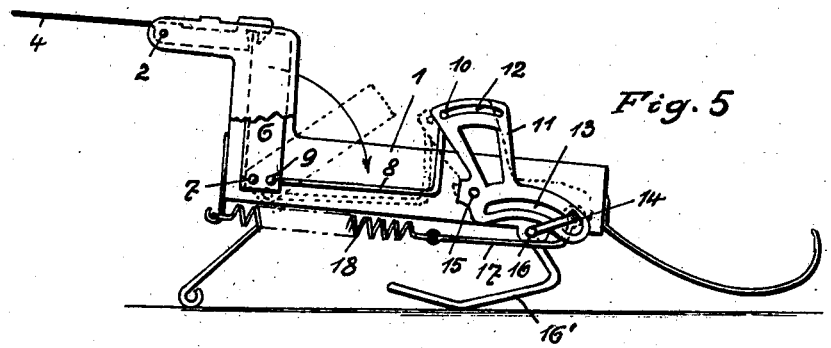
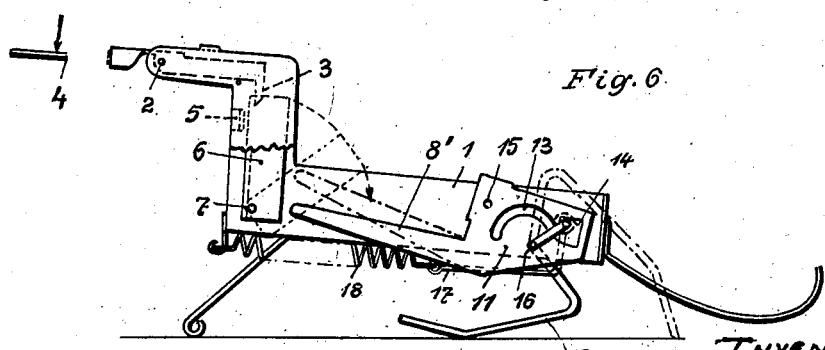

April 26, 1938.  H. MÜLLER ET AL  2,115,315
TOY OR AMUSEMENT DEVICE
Filed March 10, 1937   5 Sheets-Sheet 3
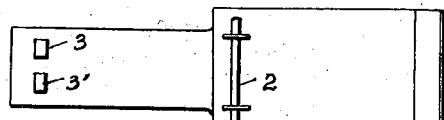
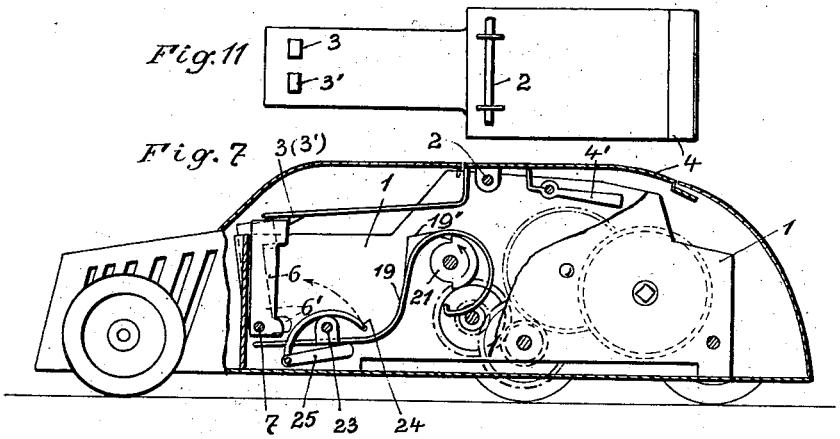
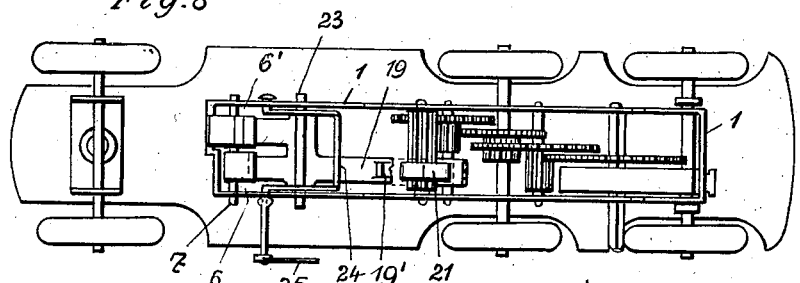
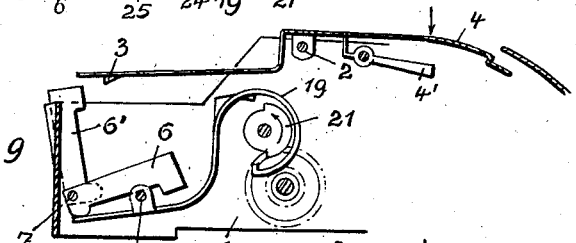
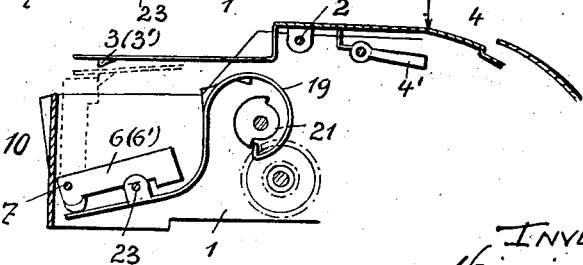

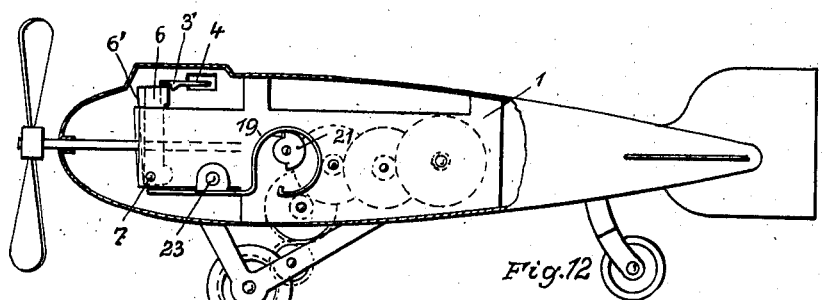
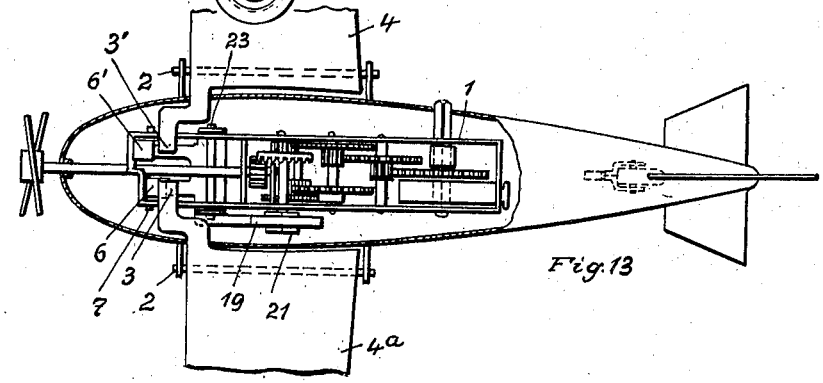
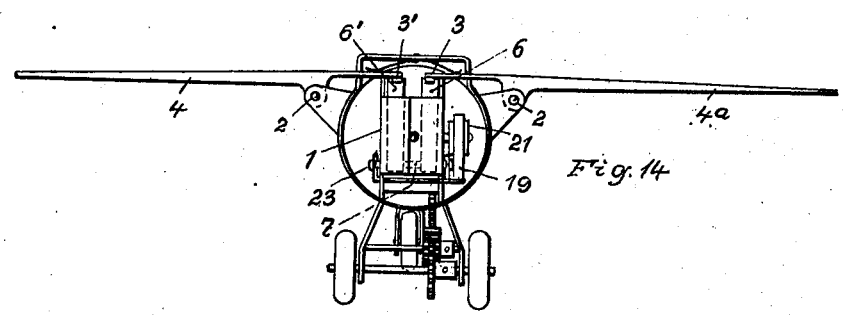

April 26, 1938.　　H. MÜLLER ET AL　　2,115,315
TOY OR AMUSEMENT DEVICE
Filed March 10, 1937　　5 Sheets-Sheet 5

Patented Apr. 26, 1938

2,115,315

UNITED STATES PATENT OFFICE 2,115,315

TOY OR AMUSEMENT DEVICE

Heinrich Müller, Nuremberg, Karl Vogl, Muhlhof auf d. Schanz, and Fritz Sorg, Nuremberg, Germany; said Vogl and Sorg assignors to said Müller Application March 10, 1937, Serial No. 130,186
In Germany November 8, 1935

19 Claims. (Cl. 46—210)

This invention relates to toys or amusement devices and more particularly to toy-vehicles, such as toy-automobiles, toy-airplanes and the like. Our invention consists essentially in a novel construction and arrangement of a toy or amusement device comprising essentially a switch actuated by means of a current of air blown thereagainst, and a weighted lever actuated by gravity and arranged to be locked and released by said switch. Said lever, upon being released by said switch, moreover, will drop by action of gravity, to actuate or release the driving mechanism of the toy or initiating some operating motion thereof.

According to our invention, the toy or amusement device may thus be operated in an extremely simple and surprising way without in the least touching the toy. Said blow-switch and said weighted lever co-operating therewith may be used, in addition, either to initiate a single operation of the toy—which in case of toy-vehicles driven by means of a clockwork may be considered as presenting certain disadvantages—or preferably also a plurality of subsequent operations of the toy.

In order to afford by action of said blow-switch and said lever a plural actuation of a toy such as a toy-automobile, a toy-airplane or the like, that is, in order to initiate and subsequently stop or to stop and subsequently again initiate the travel of the toy, according to our invention there are provided two or more weighted levers, said levers controlling the motion of the clockwork of a toy-vehicle by being subsequently released upon repeated actuation of said blow-switch, thus causing said levers to drop and to initiate certain motions which at least serve to operate said clockwork in a manner to be first released and thereupon locked or vice versa.

In this manner the toy-vehicle may also be controlled by a plurality of blow-switches and weighted levers actuated thereby, for instance in such a manner that the toy-vehicle will either be stopped when travelling, or set into motion from condition of rest.

Furthermore, according to our invention also more than two weighted levers, for instance three, four or more levers may be used in which case the action of the third or fourth lever may either compensate the effect of a previously actuated lever or initiate some additional motion of the toy-vehicle or also serve to control some additional device forming part of the toy. Such additional device may, for instance, consist of a detonation-device which may be caused to come into effect, or of a sign or figure to be swung out of the body of the toy.

In the accompanying drawings, we have shown three groups of examples of construction of our present toy together with the blow-switch and weighted lever or levers serving for the control of the toy.

Figure 1A:
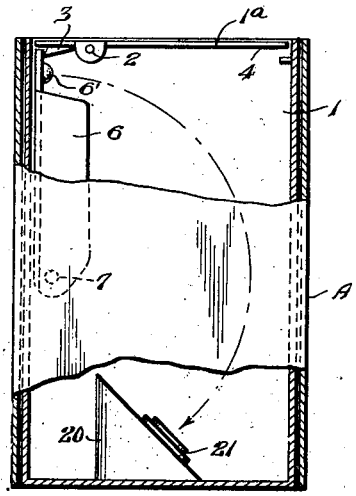
Figure 2:
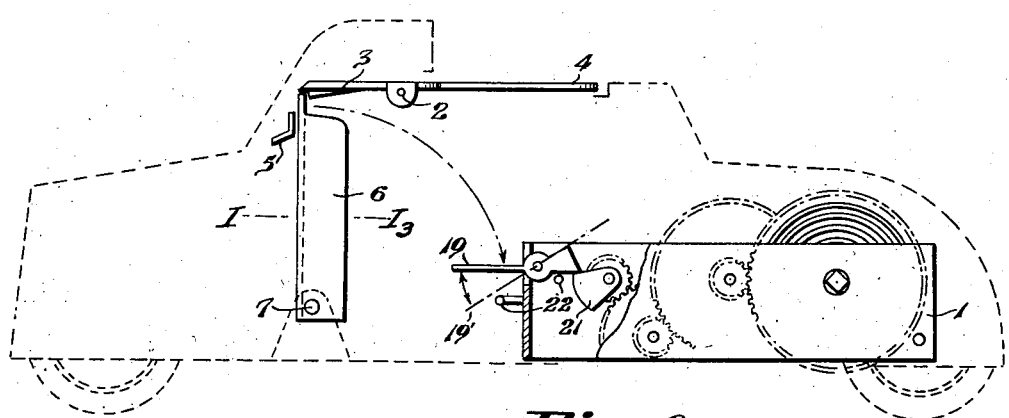
Figure 2A:

Said first group of examples of construction is represented in Figs. 1 to 6 and comprises toy-vehicles or similar amusement-devices operated by means of a blow-switch and weighted lever controlled by the former. More particularly, Figs. 1 and 1a are respectively a front-view and longitudinal section, partly broken away, of a toy having the form of a box, said toy including a detonation-device actuated by a weighted lever controlled by a blow-switch, Fig. 2 a diagrammatic side-view of a toy-automobile which is started by action of said blow-switch and said weighted lever. Fig. 2a is a horizontal sectional view taken on the line I—I of Fig. 2. Figs 3 to 6 are diagrammatic views showing a toy set into leaping motion by means of a blow-switch and weighted lever, Figs. 3 and 4 showing in particular in a side-view and plan-view, respectively, a skeleton of the operating members of said toy in inoperative condition thereof, while Fig. 5 is a view similar to Fig. 3, showing said toy in tensioned condition, that is in condition ready to leap, and Fig. 6 a similar view showing the construction of a leaping toy equipped with a blow-switch and a weighted lever controlled thereby.

The second group of constructions of toy-vehicles is of the form of a toy-automobile or toy-airplane operated by two weighted levers and one or two blow-switches controlling the former. More particularly, Fig. 7 is a side-view of a toy-automobile with broken-away toy-body showing parts of the clockwork and other operating members, Fig. 8 a top-view on Fig. 7 showing especially the clockwork mounted on the base-plate of the toy-automobile, Figs. 9 and 10 are detail-views showing several operating positions of the toy shown in Figs. 7 and 8, Fig. 11 is a bottom-view showing the blow-switch forming part of said toy, said blow-switch consisting essentially of a plate or membrane, Fig. 12 a side-view, partly broken away, of a toy-vehicle in the form of an airplane, Fig. 13 a similar top-view taken on Fig. 12, and Fig. 14 a front-view of the toy shown in Figs. 12 and 13.

Figure 15:
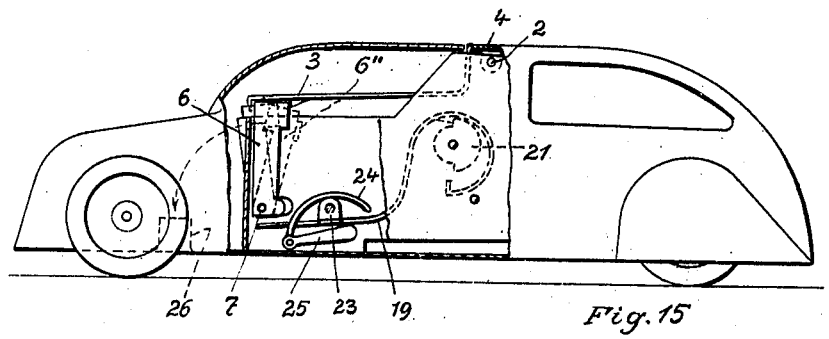
Figure 16:
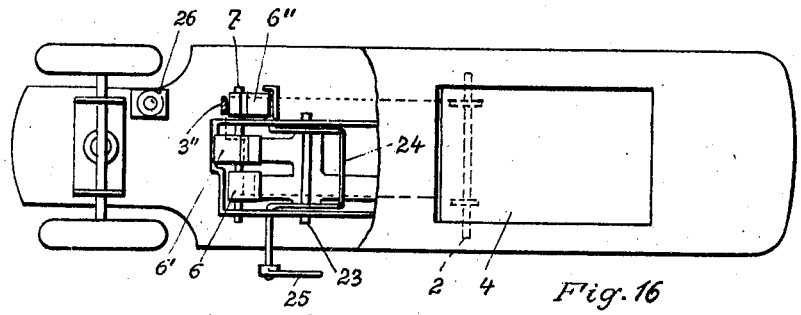
Figure 17:
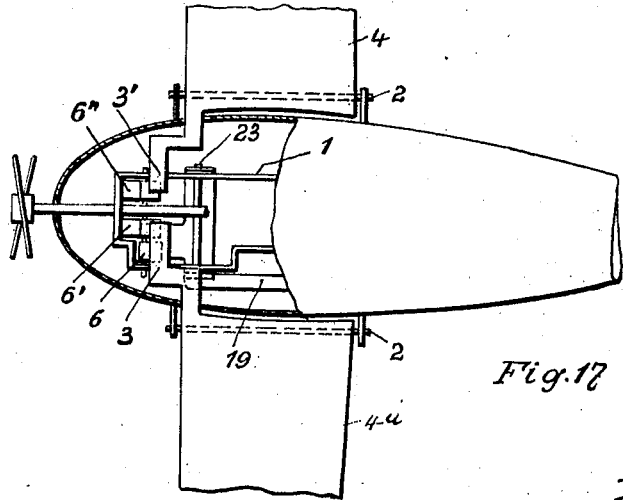

The third group of constructions of toy-vehicles shown in Figs. 15 to 17 comprises toys in the form of an automobile or of an airplane comprising three weighted levers as well as one or two blow-switches controlling the former. More particularly, Fig. 15 is a side-view, partly broken away, of a toy-automobile, Fig. 16 a plan of the toy shown in Fig. 15 with partly broken away front-part, and Fig. 17 a partly broken-away top-view of a toy in the form of an airplane.

In all forms of construction of our present toy, there is provided throughout a locking-device 2, 3, 4 consisting of a double-armed lever that may be actuated by an air-current or harshly pronounced word blown or spoken against said locking-device which in other words is constructed as a blow-switch. This blow-switch co-operates with at least one weighted lever 6 swingable about its pivot 7, said lever being kept in erected position by means of said blow-switch and caused to exert the controlling motion proper upon the toy by action of its falling motion, that is when released by said blow-switch.

In the construction shown in Fig. 1 the toy is formed in the manner of a box and consists of an outer sleeve A which surrounds a box-like body 1. In this box-like body there is mounted a weighted lever 6, preferably of U-shaped cross-section and swingable about its pivot 7. At its upper end said lever 6 carries a small weight, for instance, in the form of a hammer 6', which when being dropped will hit against an anvil 20, said anvil comprising a socket for the reception of a percussion-cap, primer or the like producing a detonation.

The weighted lever 6 is kept in position by a blow-switch consisting of said double-armed lever having arms 3, 4, said lever being swingable about its pivot 2. As shown in Fig. 2, said lever is provided at its left-hand end 3 with a nose or detent engaging with the upper end of said lever 6 to keep the latter in inoperative that is in erected position. Moreover, the operating surface of said blow-switch is provided on the right-hand arm 4 of said double-armed lever and thus forms the upper wall 1a of said box-shaped body, without, however, being in any way conspicuous. Upon depression of the operating surface of said blow-switch due to an air-current or a word blown or spoken thereagainst the lever 6 will be released by said nose or detent and caused to drop so that the hammer 6' will hit against the socket in said anvil 20. The blow-switch may also be operated and the lever 6 released thereby, besides by an air-current or a spoken word, for instance by a water-droplet dropped onto the operating surface of the blow-switch. In every case, therefore, the toy may be controlled and operated without in any way touching the same.

The toy may again be adjusted to keep the lever 6 in inoperative, that is in erected position, by drawing the inner box-like body 1 out of the sleeve A, adjusting said lever 6 into locked position and inserting again said body 1 into said sleeve in a manner similar to opening and closing a match-box.

In the construction shown in Fig. 2 the weighted lever 6 swingable about its pivot 7, when released by the nose or detent will drop onto the left-hand arm of a double-armed locking-lever 19 which projects with its right-hand arm into the path of motion of a member 21 mounted upon an axle of the spring-driven clockwork and rotating with the latter. The swinging motion of the locking-lever 19 is limited by two stops 22, thus causing said lever 19 upon actuation by said lever 6 to assume its position along the dash-dotted line 19' shown in Fig. 2, to release the clockwork and impart traveling motion to the toy. The weighted lever 6 is safely kept in inoperative position by means of the blow-switch comprising the double-armed release lever 3, 4 acting on said lever 6. The blow-switch shown in Fig. 2 is similar to that shown in Fig. 1. According to Fig. 2 swinging motion of the lever 6 beyond its erected position is limited by a stop 5. The plate or membrane 4 formed by the one arm of the blow-switch will be set into a small swinging motion by action of an air-current blown thereagainst or by some other slight outer influence, such as spoken words or the like, said swinging motion now releasing said weighted lever 6 to drop and release the locking lever 19 for the clockwork.

In the construction shown in Figs. 3, 4 and 5 leaping motion of the toy is initiated by suddenly releasing a spring that had been kept locked in tensioned condition. According to Figs. 3, 4 and 5 the toy and its clockwork is surrounded by a frame 1 which may for instance represent the skeleton of an animal. In said frame 1 there is mounted swingably about a pivot 2 a release lever 3, 4 forming part of the blow-switch. This release lever is properly mounted to permit slight swinging motion thereof, thus causing the locking end 3 of said lever to engage the weighted lever 6 swingable about its pivot 7, the erecting motion of said latter lever being limited by a stop 5. Hinged to the lever 6 at the point 9 thereof is a rod 8 connecting said lever with a locking-member 11 swinging with the former, about the pivot 15. Said locking member 11 is provided with two guide-slots 12, 13, the rod 8 slidingly engaging at its end 10 with said slot 12. A crank-lever 16, 16' engages with its crank said guide-slot 13, said crank-lever representing the rear legs of the leaping animal toy, the spring 18 acting onto said crank by the intermediary of a small connecting rod 17. The guide-slot 13 on the locking-member 11 is equipped at its rear end with a step or recess 14 which serves to lock the crank-lever forming said rear legs if these have been moved into operating position shown in Fig. 5. In this position the spring 18 will likewise be under tension, while the lever 6 will be in locked, that is in erected position.

If now a current of air is blown onto the outwardly extending arm or membrane 4 of the blow-switch, the left-hand arm of lever 3, 4 now will be caused to swing slightly downward and its end 3 will release the formerly locked weighted lever 6 which now drops swinging about its pivot 7, at the same time exerting a pull on the locking member 11 by way of rod 8, the step or recess 14 in the slot 13 being now lifted to release the crank-lever representing the legs 16, 16'. The legs 16, 16' will now suddenly be drawn towards the rear by action of the tension of a spring, that is said legs will move from the position shown in Fig. 5 into the position shown in Fig. 3 with the result that a leaping motion is now imparted to the toy. The membrane 4 forming part of the blow-switch for actuating the leaping toy is preferably made of rubber or some other sufficiently strong but not rigid material, as is assumed especially in the construction represented in Fig. 6.

In this construction the rod 8 connecting the weighted lever 6 with the locking member 11 is dispensed with. According to Fig. 6 the locking member 11 swingable about the pivot 15 is provided only with one guide-slot 13 including a step or recess 14 for the crank forming the legs 16, 16'. Moreover, said locking member 11 is provided with an arm 8' extending in forward direction of the toy. This arm 8' is positioned in the path of falling motion of lever 6 and thus forms a pressure-arm serving for the release of the legs 16, 16'. This arm 8', however, acts also as an erecting member for said weighted lever by reason of its upward swinging motion which is caused by displacement of said crank. While in the aforedescribed constructions of toys only a single operation takes place, subsequent to which the toy is again moved into position ready for operation, it will be possible especially in case of toys comprising a spring-driven clockwork to effect also a plurality of operations by action of said blow-switch, two or more weighted levers being used for this purpose as may be seen from Figs. 7 to 17.

In the construction of toy according to Figs. 7 to 14, there are provided two weighted levers 6, 6' placed side-by-side in the casing of the clockwork 1, said levers being mounted at their foot-end freely swingable about a pivot 7. The upper ends of the weighted levers 6, 6' are locked by a blow-switch 4 swingable about a pivot 2, said blow-switch engaging with its front locking-arm the upper ends of the levers 6, 6', locking noses 3, 3' being provided on said arm for this purpose.

In the construction shown in Figs. 7 to 11 there are two locking noses 3, 3' on the prolonged release or locking lever or membrane 4 of the blow-switch, said lever being kept in upwardly swung or locked position by means of a light spring or a further counter-acting weighted lever 4'.

The foot-ends of said weighted levers 6, 6' are formed as pressure-cams adapted to engage from above with a locking-arm 19 swingable about a pivot 23. Said arm 19 engages with its weighted front end 19' which is of curved conformation with a cam-shaped rotary member 21 mounted on the last driven axle of the clockwork 1. Within said locking-arm 19 there are provided two locking noses which may alternately engage with the cam-surfaces on the member 21 to lock the clockwork 1 and stop travelling motion of the toy.

In its erected position the one weighted lever 6 has a surplus of weight in rearward direction, that is in direction towards the clockwork, while the second weighted lever 6' has a surplus of weight in forward direction preventing at first a tilting motion toward the rear, that is in direction to the clockwork. From this it follows that in erected position of the weighted levers 6, 6' at first only lever 6 engages with the locking-nose 3 on the prolonged release-lever of the blow-surface or membrane 4 of the blow-switch and thus is kept in locked position. If now a current of air is blown against said surface or membrane 4, the latter will slightly swing about its pivot 2, thus releasing the weighted lever 6 and imparting swinging motion in upward direction to the locking-arm 19 by action of the pressure-cam at the foot-end of said lever. The arm 19 now moves into the position shown in Fig. 9 releasing member 21 and permitting operation of the clockwork for starting the toy-vehicle. By action of the shock due to acceleration of the vehicle the second weighted lever 6' will now swing towards the rear in direction against the clockwork and move into the position ready for dropping in which position it is at first kept by the nose 3' of the blow-switch, as indicated in dotted lines in Fig. 10.

If now a further current of air is blown against the blow-surface or membrane 4, a second swinging motion will be imparted to the latter, releasing the lever 6' which now owing to its surplus of weight will likewise be tilted to move in direction towards the clockwork. The lever 6' now causes by action of the somewhat larger pressure-cams thereon a further upward swinging motion of the locking arm 19 so that the latter with its nose at the end thereof will again extend into the path of motion of member 21, thus again interrupting travelling motion of the toy. Now the condition of the toy ready for travel is again established by erection of the weighted levers. Such erection of the levers may be brought about by tilting the toy downward over its front part or by reversing a special erecting member 24, 25 as shown in Figs. 7 and 8, which may be done by hand.

While the two operations for starting and stopping the toy-vehicle are effected in the constructions according to Figs. 7 to 11 by means of a double-armed blow-switch according to the constructions shown in Figs. 12 to 14 these two operations are effected by means of a blow-switch made of two distinct parts. In this case two blow-surfaces or membranes are provided on the blow-switch each having a locking-nose for each weighted lever. The arrangement and mode of operation of the weighted levers in the latter constructions is the same as in the constructions shown in Figs. 7 to 11. The two blow-surfaces or membranes of the blow-switch according to Figs. 12 to 14, more particularly, are formed by the two wings 4, 4ᵃ of the toy-airplane, said wings being each swingable about a pivot 2. The wings 4, 4ᵃ extend beyond their pivots 2 towards the inside in form of two extensions or arms having noses 3, 3' thereon engaging with the weighted levers 6, 6' from the rear to keep the latter locked in erected position.

The two supporting wings 4, 4ᵃ forming the two blow-surfaces of the blow-switch are kept in normal, that is in locking position, by means of a spring. In case of small toys which are naturally equipped with relatively small wings acting as blow-surfaces evidently the member 21 destined for braking the clockwork acts with only a very slight pressure against the locking-arm 19. In consequence of this also only a very small pressure due to a current of air blown against said blow-surfaces will be sufficient to bring about the desired operation of the toy. The very small engaging pressure between member 21 and arm 19 may practically be attained in every case by choosing a high ratio of transmission and therewith a high speed of rotation of the member 21.

The weighted levers, besides for controlling the travel of the toy-vehicle, may further be utilized for controlling other devices, such as for instance devices for firing a shot in case of toys of the kind of tank-vehicles or devices for operating a signal or the like.

Constructions of toy-vehicles with such additional weighted levers are represented in Figs. 15 to 17.

In the constructions of toy-vehicles shown in Figs. 15 and 16 which are provided with a manually operated erecting device for the weighted levers, there is provided, besides the two weighted levers 6, 6' serving for the control of the clockwork, a third weighted lever 6". The direction of falling motion of this lever 6" is opposite to that of the levers 6, 6'. In the path of motion of said additional lever 6" there is provided an anvil 26 adapted for the reception of a percussion-cap, primer or the like causing a detonation, whenever the lever 6" is released to fall upon said anvil.

In erected condition of the lever 6", as shown in dotted lines in Fig. 15, said lever is inclined to present a surplus weight in rearward direction. The lever 6" is kept in this position by means of a stop and prevented against forward swinging by a third nose 3" provided at the locking-arm 3 on the blow-surface or membrane 4 of the blow-switch. This lever, however, is still under action of its surplus weight acting in rearward direction and thus is not yet engaged by said nose 3". Engagement is brought about, if the toy-vehicle that had previously been adjusted to condition of travel is being stopped by a second blow-switch. By action of the shock exerted due to stopping the vehicle, the lever 6" will be swung with its upper end towards the front and is now supported by the nose 3" of the locking-arm 3 of the blow-switch. If now the blow-switch is acted upon a third time, the lever 6" will likewise be released and fall in forward direction onto the anvil 26.

Fig. 17 shows another arrangement of three weighted levers in connection with a toy-vehicle having the form of an airplane. In order to control the clockwork and therewith the travelling motion of the toy, there are provided on the one side the two levers 6, 6' which are kept locked by the noses 3 of the movable half 4ª of the wings forming the blow-switch. The lever 6 in this case is already locked, while lever 6' is still in its rearward position and moves only into its locked position, when a shock is exerted thereon due to imparting motion to the toy, said motion having been initiated by a previous action of the blow-switch.

Adjacent said levers 6, 6' there is provided a third lever 6" which is locked by the half 4 of the wings forming the blow-switch, until said lever 6" is released by the nose 3' forming part of the blow-switch. The falling motion of lever 6" now may be utilized to release any desired further motion, for instance to effect the raising or swinging of a landing-flag or the like.

The mode of operation of the blow-switch comprising two blow-surfaces or membranes as well as the general operation of the toy-vehicle is the same as that of the construction shown in Figs. 13 and 14.

The additional third lever 6" in both forms of construction of the toy according to Figs. 15 and 17 may evidently also be utilized, besides the aforementioned possibilities of operation, for any other purposes.

Similar to erecting the levers 6, 6' by means of a manual device 24, 25 for controlling the clockwork, the third lever 6" may likewise be erected by a manual device not shown in the drawings.

The current of air to be directed towards the blow-switch to effect release of the weighted levers may be produced by merely blowing or speaking against said blow-switch. A toy-vehicle may thus for instance be started by merely speaking a certain word, such as "off" more or less harshly against the blow-switch. Or, in case of stopping a travelling toy-vehicle, for instance, the word "stop" may be spoken against said blow-switch.

In all forms of construction of our novel toy the blow-switch may be mounted in any desired position on the toy and is by no means confined to an horizontal arrangement as shown in the drawings. This horizontal arrangement of the blow-switch, however, is regarded as being the most effective, as it permits to direct the current of air against the blow-switch in direction from above, said current of air being produced either by actual blowing or by merely speaking more or less harshly from above against the blow-switch or against the toy in general.

Instead of one additional weighted lever it will also be possible to use more such additional levers and eventually also two or more additional blow-switches actuating said additional levers.

We claim:

1. A toy consisting of a moving figure, comprising a prime mover within the toy body, means for controlling the action of said prime mover, an actuator for said means, a blow-switch locking said actuator in inactive position, said blow-switch being fulcrumed at a point causing it to be sensitive to a small force to release said actuator, whereby the application of a small force to said blow-switch will cause said actuator to act upon said means, to control the prime mover.

2. A toy consisting of a moving figure, comprising a prime mover within the toy body, means for controlling the action of said prime mover, a weighted lever, a blow-switch locking said lever in erected position, said blow-switch being fulcrumed at a point causing it to be sensitive to a small force to release said weighted lever, whereby the application of a small force to said blow-switch will release said weighted lever and cause the latter to act upon said means, to control the prime mover.

3. A toy as claimed in claim 1 wherein said blow-switch forms a part of a surface of said toy to avoid conspicuousness of said blow-switch.

4. A toy as claimed in claim 1 wherein said blow-switch is in the form of a horizontal surface to permit said blow-switch to respond to a current of air blown from above against said horizontal surface.

5. A toy consisting of a moving figure, comprising a spring-driven clockwork, a weighted lever, a blow-switch locking said weighted lever in erected position, said blow-switch being fulcrumed at a point causing it to be sensitive to a small force to release said weighted lever, an arm for locking said clockwork, said arm being positioned in the path of falling motion of said weighted lever, whereby the application of a small force to said blow-switch will release said weighted lever, permitting the same to fall on to the locking arm to release said clockwork for imparting traveling motion to said toy.

6. A toy in the form of a leaping figure, comprising a spring, a swingable locking member, a crank lever associated with said spring and co-operating with a guide slot in said locking member, to retain said spring in tensioned condition, a weighted lever, a blow-switch locking said weighted lever in erected position, said blow-switch being fulcrumed at a point causing it to be sensitive to a small force, to release said weighted lever, whereby the application of a small force to said blow-switch will cause said weighted lever to act upon said swingable locking member to release said spring and crank arm and thereby impart a leaping motion to the toy.

7. A toy as claimed in claim 6 including a connecting rod interposed between said locking member and said weighted lever, whereby the falling motion of the latter will release said locking member.

8. A toy as claimed in claim 6 wherein said locking member is provided with an extension positioned in the path of falling motion of said weighted lever.

9. A toy as claimed in claim 6 wherein said spring, said crank lever, said locking member, and said blow-switch are mounted essentially within a frame in the body of said toy, said blow-switch being provided with a tongue extending out of said frame, said crank lever extending out of said frame to form the rear leaping legs of said toy.

10. A toy as claimed in claim 1, wherein said blow-switch comprises a blow surface consisting of a yielding material.

11. A toy as claimed in claim 6 wherein a reverse swinging movement of said crank lever will tension said spring and return said weighted lever to a position locked by said blow switch.

12. A toy consisting of a moving figure, comprising a prime mover within the toy body, control means for locking and releasing said prime mover, a plurality of actuators, one of said actuators being active upon said control means to release the prime mover, the other of said actuators being active upon the control means to lock said prime mover, a blow-switch locking said actuators, said blow-switch being fulcrumed at a point causing it to be sensitive to a small force, to release said actuators seriatim, to operate said control means.

13. A toy as claimed in claim 12 wherein said toy is in the form of an airplane, and including a plurality of blow-switches each controlling one of said actuators.

14. A toy as claimed in claim 12 wherein said actuators are in the form of weighted levers adapted to be erected and locked in differently inclined positions by said blow-switch, said levers having in this position different centers of gravity, permitting said levers to be released seriatim by said blow-switch.

15. A toy as claimed in claim 12 wherein said actuators are in the form of weighted levers, the second and following of said levers being controlled by the first lever and kept in condition ready for falling motion.

16. A toy as claimed in claim 12 including manual means for returning said actuators to locked position.

17. A toy consisting of a moving figure, comprising a prime mover within the toy body, control means for locking and releasing said prime mover, a plurality of weighted levers, certain of said levers being active upon said control means to release the prime mover, certain of said levers being active upon the control means to lock said prime mover, and a blow-switch locking all of said levers, said blow-switch being fulcrumed at a point causing it to be sensitive to a small force, whereby upon successive operations of said blow-switch, said levers are successively released to act upon said control means.

18. A toy consisting of a moving figure, comprising a prime mover within the toy body, control means for locking and releasing said prime mover, at least two weighted levers, one of said levers being active upon said control means to release said prime mover, the other of said levers being active upon the control means to lock said prime mover, and a plurality of blow-switches fulcrumed at points causing them to be sensitive to a small force, each of said blow switches locking at least one of said levers, whereby upon the application of a small force to either of said blow-switches, its respective lever will be released to act upon said control means.

19. A toy consisting of a moving figure, comprising a spring-driven clockwork, an arm adapted to alternately lock and release said clockwork, a plurality of weighted levers normally maintained in erected position and operable upon their falling movements to actuate said arm, a blow-switch locking said levers in erected position, means on at least one of said levers for shifting said arm to locking position, and means on at least another of said levers for shifting said arm to releasing position, said blow-switch being fulcrumed at a point causing it to be sensitive to a small force to release said levers one at a time upon successive operations of said blow-switch.

HEINRICH MÜLLER.
KARL VOGL.
FRITZ SORG.